United States Patent
Huang

(10) Patent No.: US 12,015,580 B2
(45) Date of Patent: Jun. 18, 2024

(54) METHOD AND APPARATUS FOR DISPLAYING UNREAD MESSAGE, ELECTRONIC DEVICE, AND STORAGE MEDIUM

(71) Applicant: VIVO MOBILE COMMUNICATION CO., LTD., Guangdong (CN)

(72) Inventor: Jing Huang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 18/155,845

(22) Filed: Jan. 18, 2023

(65) Prior Publication Data

US 2023/0155967 A1    May 18, 2023

Related U.S. Application Data

(63) Continuation of application No. PCT/CN2021/107573, filed on Jul. 21, 2021.

(30) Foreign Application Priority Data

Jul. 22, 2020    (CN) .......................... 202010709228.3

(51) Int. Cl.
*H04L 51/04* (2022.01)
*G06F 3/04817* (2022.01)
(Continued)

(52) U.S. Cl.
CPC .......... *H04L 51/04* (2013.01); *G06F 3/04817* (2013.01); *G06F 3/0486* (2013.01); *H04L 51/21* (2022.05)

(58) Field of Classification Search
CPC .. G06F 3/0482; G06F 3/0488; G06F 3/04847; G06F 3/0481; G06F 9/542;
(Continued)

(56) References Cited

U.S. PATENT DOCUMENTS 8,996,997 B2 *  3/2015  Xu ........................... H04L 51/42
                                                                  715/728
9,913,114 B1 *  3/2018  Wu .......................... G06T 11/60
(Continued)

FOREIGN PATENT DOCUMENTS

CN    105635400 A    6/2016
CN    106681587 A    5/2017
(Continued)

OTHER PUBLICATIONS

Extended European Search Report, Issued Dec. 4, 2023, Munich, Germany.
(Continued)

*Primary Examiner* — Dustin Nguyen

(74) *Attorney, Agent, or Firm* — Price Heneveld LLP

(57) ABSTRACT

Embodiment of this application provide a method and apparatus for displaying an unread message, an electronic device, and a storage medium. The method includes: displaying a program corner mark in a case that an unread message is received through a target application; receiving a first input performed by a user on the program corner mark; displaying an information window in response to the first input, where the information window includes an identifier of a target contact, the target contact is a contact meeting a preset condition in contacts corresponding to the unread message, and receiving a second input performed by the user on the identifier of the target contact; and starting the target application in response to the second input.

20 Claims, 12 Drawing Sheets

(51) Int. Cl.
*G06F 3/0486* (2013.01)
*H04L 51/21* (2022.01)

(58) Field of Classification Search
CPC ..... H04L 51/42; H04L 51/212; H04L 51/234;
H04L 63/08; H04L 65/401; H04L 51/224;
H04L 65/403; G06T 11/60; H04M 1/67
See application file for complete search history.

(56) References Cited

U.S. PATENT DOCUMENTS

| | | | | |
|---|---|---|---|---|
| 2005/0120306 | A1* | 6/2005 | Klassen | G06F 3/0488 715/765 |
| 2011/0231499 | A1* | 9/2011 | Stovicek | H04L 51/42 709/206 |
| 2012/0150970 | A1* | 6/2012 | Peterson | H04L 65/401 715/810 |
| 2012/0204191 | A1* | 8/2012 | Shia | G06F 9/542 719/318 |
| 2013/0346882 | A1* | 12/2013 | Shiplacoff | H04L 65/403 715/753 |
| 2014/0256295 | A1 | 9/2014 | Peng et al. | |
| 2014/0344711 | A1* | 11/2014 | Hallerstrom Sjostedt | H04L 51/234 715/752 |
| 2015/0177970 | A1* | 6/2015 | Choi | H04L 51/224 715/752 |
| 2016/0057154 | A1* | 2/2016 | Ferguson | H04L 63/08 715/741 |
| 2017/0075737 | A1* | 3/2017 | Kim | G06F 3/0488 |
| 2017/0357439 | A1* | 12/2017 | Lemay | H04M 1/67 |
| 2018/0188935 | A1* | 7/2018 | Singh | G06F 3/04847 |
| 2019/0138160 | A1* | 5/2019 | Deets, Jr. | H04L 51/212 |
| 2020/0192867 | A1* | 6/2020 | McBeath | G06F 3/0481 |
| 2022/0086271 | A1* | 3/2022 | Luo | H04L 51/234 |
| 2022/0224665 | A1* | 7/2022 | Zhou | G06F 3/0482 |

FOREIGN PATENT DOCUMENTS

| | | |
|---|---|---|
| CN | 107682524 A | 2/2018 |
| CN | 107734179 A | 2/2018 |
| CN | 108255402 A | 7/2018 |
| CN | 110134484 A | 8/2019 |
| CN | 110750188 A | 2/2020 |
| CN | 110769118 A | 2/2020 |
| CN | 110855830 A | 2/2020 |
| CN | 111885258 A | 11/2020 |
| EP | 3667480 A1 | 6/2020 |
| WO | 2018120190 A1 | 7/2018 |

OTHER PUBLICATIONS

European Patent Office, Extended European Search Report, Dec. 4, 2023, Munich, Germany.

* cited by examiner

METHOD AND APPARATUS FOR DISPLAYING UNREAD MESSAGE, ELECTRONIC DEVICE, AND STORAGE MEDIUM

CROSS-REFERENCE TO RELATED APPLICATIONS

This application is a continuation application of International Application No. PCT/CN2021/107573 filed on Jul. 21, 2021, which claims the priority of Chinese Patent Application No. 202010709228.3 filed in China on Jul. 22, 2020, which are incorporated herein by reference in their entireties.

TECHNICAL FIELD

This application relates to the field of communication technologies, and in particular, to a method and apparatus for displaying an unread message, an electronic device, and a storage medium.

BACKGROUND

At present, when an application receives information, and the information is unread, a quantity of unread messages is displayed at a program corner mark as a small red dot plus a number. For a user, the numbers only show quantities of unread messages, and the user does not learn of the importance of the unread messages, and often clicks to open the application due to garbage content and the like, resulting in a waste of time.

SUMMARY

According to a first aspect, the embodiments of this application provide a method for displaying an unread message, including:
  displaying a program corner mark in a case that an unread message is received through a target application;
  receiving a first input performed by a user on the program corner mark;
  displaying an information window in response to the first input, where the information window includes an identifier of a target contact, the target contact is a contact meeting a preset condition in contacts corresponding to the unread message, and the preset condition is associated with an input direction of the first input, where
  receiving a second input performed by the user on the identifier of the target contact; and
  starting the target application in response to the second input, and displaying a user interface of the target application, where the user interface includes message content corresponding to the identifier of the target contact.

According to a second aspect, the embodiments of this application provide an apparatus for displaying an unread message, including:
  a display module, configured to display a program corner mark in a case that an unread message is received through a target application;
  a receiving module, configured to receive a first input performed by a user on the program corner mark; and
  a processing module, configured to display an information window in response to the first input, where the information window includes an identifier of a target contact, the target contact is a contact meeting a preset condition in contacts corresponding to the unread message, and the preset condition is associated with an input direction of the first input, where
  the receiving module is further configured to receive a second input performed by the user on the identifier of the target contact; and
  the processing module is further configured to start the target application in response to the second input, and display a user interface of the target application, where the user interface includes message content corresponding to the identifier of the target contact.

According to a third aspect, the embodiments of this application provide an electronic device, including: a memory, a processor, and a program or instructions stored in the memory and executable on the processor, where the processor, when executing the program or instructions, implements the steps of the method for displaying an unread message according to the first aspect.

According to a fourth aspect, the embodiments of this application provide a readable storage medium, storing a program or instructions, where the program or instructions, when executed by a processor, implement the steps of the method for displaying an unread message according to the first aspect.

According to a fifth aspect, the embodiments of this application provide a chip, where the chip includes a processor and a communication interface, the communication interface is coupled to the processor, and the processor is configured to run a program or instructions to implement the method for displaying an unread message according to the first aspect.

BRIEF DESCRIPTION OF THE DRAWINGS

To describe the technical solutions of the embodiments of this application or the related art more clearly, the following briefly introduces the accompanying drawings required for describing the embodiments or the related art. The accompanying drawings in the following description show some embodiments of this application, and a person of ordinary skill in the art may still derive other drawings from these accompanying drawings without creative efforts.

DETAILED DESCRIPTION

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application without creative efforts shall fall within the protection scope of this application.

It should be understood that "one embodiment" or "an embodiment" mentioned in the specification means that particular features, structures, or characteristics related to the embodiments are included in at least one embodiment of this application. Therefore, "in an embodiment" or "in embodiment one" occurs in everywhere throughout the specification may not necessarily refer to the same embodiment. In addition, these specific features, structures, or properties may be combined into one or more embodiments in any proper manner.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Figure 1:
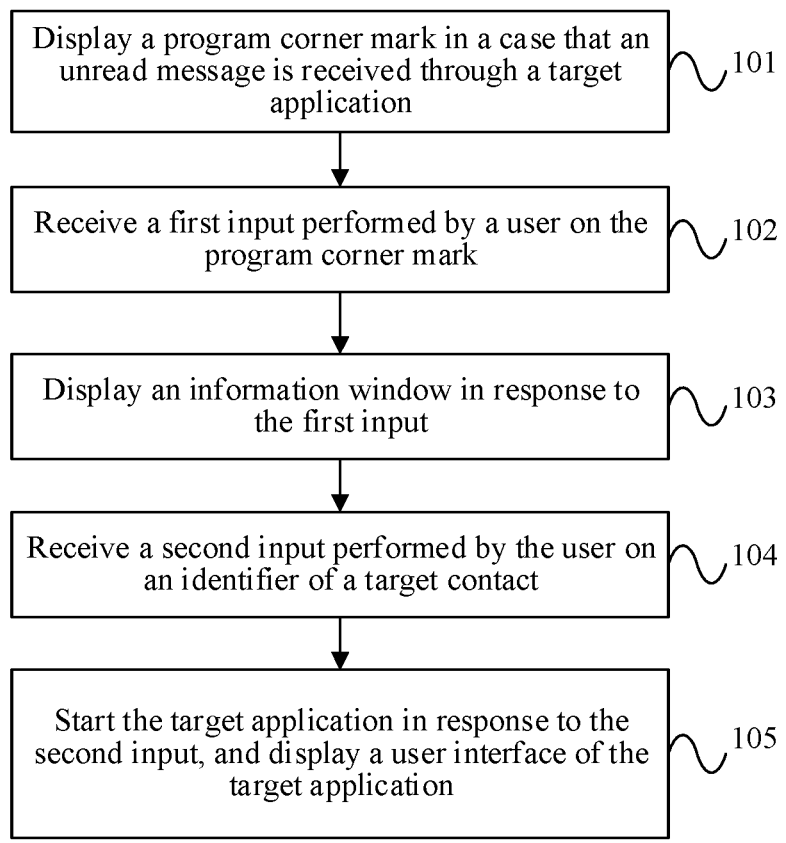
FIG. 1 is a method flowchart of a method for displaying an unread message according to an embodiment of this application.

FIG. 1 is a method flowchart of a method for displaying an unread message according to an embodiment of this application. As shown in FIG. 1, the method includes the following steps.

S101: Display a program corner mark in a case that an unread message is received through a target application.

The target application may be an application capable of implementing information exchange functions such as chatting, for example, an instant messaging application or a bulletin board program. The program corner mark may be used for indicating a quantity of all unread messages or a quantity of specific unread messages in an application. The specific unread message is an unread message meeting a preset condition. It may be understood that, when the quantity of the unread messages or specific unread messages is zero, the program corner mark is not displayed. It should be noted that the preset condition may be preset on a terminal, or may be set or changed according to usage habits of a user, which is not specifically limited in the embodiments of this application.

In addition, the program corner mark may also be used for indicating only whether any unread message or a specific unread message exists in the application. If any unread message or the specific unread message exists, the program corner mark is displayed on the program icon. If not, the program corner mark is not displayed.

S102: Receive a first input performed by a user on the program corner mark.

When the user finds that the program corner mark is displayed on the program icon while using the terminal, the user may learn that at this moment, an unread message or the specific unread message exists in an application corresponding to the program icon. Correspondingly, the user may perform a first input on the program corner mark, to trigger display of relevant information of the specific unread message meeting the sifting condition.

The first input may be a slide input starting from the program corner mark toward a preset direction, or a preset trajectory input starting from the program corner mark, or another input method, which is not specifically limited in the embodiments of this application.

S103: Display an information window in response to the first input, where the information window includes an identifier of a target contact, the target contact is a contact meeting a preset condition in contacts corresponding to the unread message, and the preset condition is associated with an input direction of the first input.

Specifically, after receiving the first input performed by the user, if the specific unread message has been obtained based on the sifting rule in the foregoing step, the terminal obtains the specific unread message, and if the specific unread message is not obtained based on the preset condition in the foregoing step, the terminal sifts all unread messages to obtain the specific unread message.

After obtaining the specific unread message, the terminal obtains a contact identifier of a contact and/or a contact identifier of a group corresponding to the specific unread message, and displays the identifiers in an information window as an identifier of the target contact. The identifier of the contact, for example, is information that can be used for identifying an identity of the contact, for example, an avatar, a nickname, a name, or an ID of the contact. Therefore, contact identifiers of contacts and/or contact identifiers of groups corresponding to unread messages viewed by the user in the information window are all obtained after sifting, so that the user can be prevented from opening the application due to an unimportant unread message.

It may be understood that, in addition to obtaining the contact identifier of the contact and/or the contact identifier of the group corresponding to the unread message in response to the first input as stated above, obtaining of the identifier of the contact may also be completed together with sifting of the unread message when each new unread message is received. When it is determined that a new unread message is a specific unread message meeting the preset condition, an identifier of a contact corresponding to the unread message is obtained, and the identifier of the contact is added to a specific data set. After receiving the first input performed by the user, the terminal directly obtains, from the data set, a contact identifier of a contact and/or a contact identifier of a group corresponding to the sifted unread message, thereby accelerating the response to the first input.

The information window may be displayed with the last contact position of the first input as a center, or the information window may be displayed next to the program icon, or the information window may be displayed in a region covering the program icon or overlapping with the program icon, or the information window may be displayed at a fixed region in a display interface of the terminal, for example, a top, a bottom, or a side of the display interface of the terminal. The position for displaying the window is not specifically limited in the embodiments of this application.

S104: Receive a second input performed by the user on the identifier of the target contact.

Specifically, after viewing the information window; the user may perform a second input on the identifier of the target contact in the information window. The second input, for example, may be an operation such as a click or a slide, which is not specifically limited in the embodiments of this application.

S105: Start the target application in response to the second input, and display a user interface of the target application, where the user interface includes message content corresponding to the identifier of the target contact.

Specifically, correspondingly, after receiving the second input, the terminal directly displays an interactive interface corresponding to the identifier of the target contact and including the unread message. The interactive interface may be an interactive interface corresponding to the identifier of the contact after the application is opened. For example, when the unread message is information sent in a group, the interactive interface is correspondingly an interactive interface of the group, and when the unread message is information sent by a contact that is a person, the interactive interface is correspondingly an interactive interface with the contact. In addition, the interactive interface may also be an interactive interface, such as a floating window, independent of the application, which is not specifically limited in the embodiments of this application.

Therefore, the user can directly jump to the interactive interface on the information window, thereby enhancing the convenience for the user to view and reply to the unread message.

In the method for displaying an unread message provided in the embodiments of this application, a first input performed by a user on a program corner mark is received, and a contact identifier of a contact and/or a contact identifier of a group corresponding to a sifted unread message are displayed and included in an information window, so that the user can obtain contact information of an unread message in a more targeted manner without opening an application, thereby reducing cases of opening the application due to an unimportant unread message.

Because the user may have requirements for a variety of preset conditions during use, based on the foregoing embodiment of this application, optionally, when the first input corresponds to different input directions, preset conditions are also different. The identifier of the target contact meeting the preset condition includes at least one of the following: an identifier of a contact with a preset important mark, a group identifier of a contact that is a group, an identifier of a contact with the unread message including a predetermined symbol and a user identifier of the user, or an identifier of a contact corresponding to the unread message.

Specifically, when an input direction of the first input corresponds to a first preset direction, the information window includes an identifier of a contact with a preset important mark.

Specifically, the important mark may be preset by the user for the contact. When the user determines that information sent by a specific contact has a high degree of importance and needs to be viewed in time, the user can mark the contact as an important contact in the terminal in advance. In addition, the important mark may also be self-marked according to factors such as a frequency of contact between the user and the contact, which is not specifically limited in the embodiments of this application.

The unread message may be information sent by the important contact to the user alone or information sent in a group.

When the input direction of the first input corresponds to a second preset direction, the information window includes a group identifier of a contact that is a group. Specifically, when an unread message exists in the group, through the input in the second preset direction, a group identifier of the group in which the unread message exists is displayed in the information window.

When the input direction of the first input corresponds to a third preset direction, the information window includes an identifier of a contact of an unread message including a predetermined symbol and a user identifier of the user.

Specifically, an unread message including a predetermined symbol and a user identifier of the user refers to a message that is used by a second target contact in a group and that is dedicated to draw attention from the user corresponding to the user identifier, and prompts the user through the predetermined symbol and the user identifier of the user. For example, when the predetermined symbol is the "@" symbol and the user name is "Peter", the unread message including the predetermined symbol and the user identifier of the user refers to an unread message including "@Peter". It may be understood that, the symbol may also be another symbol, the user identifier may also be a user ID and other identification information, or an identifier of a small group of the user in the group or all members, for example, "@everyone", which is not specifically limited in the embodiments of this application.

When the input direction of the first input corresponds to a fourth preset direction, the information window includes contact identifiers of all contacts and/or groups with an unread message.

Specifically, because only identifiers of target contacts corresponding to the sifted unread messages are displayed in the information window, but there is also a possibility that the user needs to obtain another unread message that does not meet preset conditions corresponding to the first preset direction, the second preset direction, and the third preset direction, to ensure that the user can also learn of contact information of senders of such an unread message, in this embodiment of this application, the information window corresponding to the fourth preset direction may be set to display contact identifiers of contacts and groups corresponding to all the unread messages.

It may be understood that, the first preset direction, the second preset direction, the third preset direction, and the fourth preset direction are different directions. For example, the first preset direction is leftward, the second preset direction is downward, and the third preset direction is upward. Each preset direction and each preset condition can be set in advance or in a manner selected by the user, which is not specifically limited in the embodiments of this application.

In the method for displaying an unread message provided in the embodiments of this application, different information windows may be set for different preset directions to display different types of unread messages, so that the user has more choices and flexibility when viewing contact identifiers of unread messages.

Further, based on the foregoing embodiments of this application, a display position of the information window is associated with the input direction of the first input.

For example, when the first input is a leftward input, the information window may be displayed on the left side of the program icon of the target application. The information window may be set next to the program icon or may be set with an input ending position of the first input as a center. It may be understood that, there is also another setting manner, which is not specifically limited in the embodiments of this application.

Based on the foregoing embodiments of this application, the first input includes a first sub-input and a second sub-input, the preset condition includes a first condition and a second condition, and the displaying an information window includes displaying a first window and a second window. The first window includes an identifier of a first contact, and the first contact is a contact meeting the first condition in the contacts corresponding to the unread message. The first condition is associated with an input direction of the first sub-input. The second window includes an identifier of a second contact, and the second contact is a contact meeting the second condition in the contacts corresponding to the unread message. The second condition is associated with an input direction of the second sub-input.

The method further includes:
receiving a third input of dragging the second window to the first window; and
displaying a child window in the first window in response to the third input, where the child window includes an identifier of a third contact, where the third contact meets the first condition and the second condition.

The first sub-input and the second sub-input correspond to input operations in different directions respectively, and are used for triggering display of the first window and the second window, and the identifiers of the contacts displayed in the first window and the second window correspond to the first condition and the second condition respectively.

Specifically, the user may need to further restrict the sifting condition of the unread message during use, for example, need to display only a contact identifier of a group corresponding to a contact with a preset important mark and sending an unread message including a predetermined symbol and a user identifier of the user in the window. In this case, if the sifting condition is preset by the terminal and cannot be changed, the foregoing requirement of the user cannot be met. If the sifting condition can be modified or self-set, it usually requires the user to perform setting through a corresponding setting interface, resulting in relatively complex operations.

Based on the foregoing problem, in this embodiment of this application, the user can drag the second window to the first window, so as to display a child window in the first window: Identifiers of contacts displayed in the child window is an intersection set between identifiers of contacts displayed in the first window and identifiers of contacts displayed in the second window.

Figure 2:
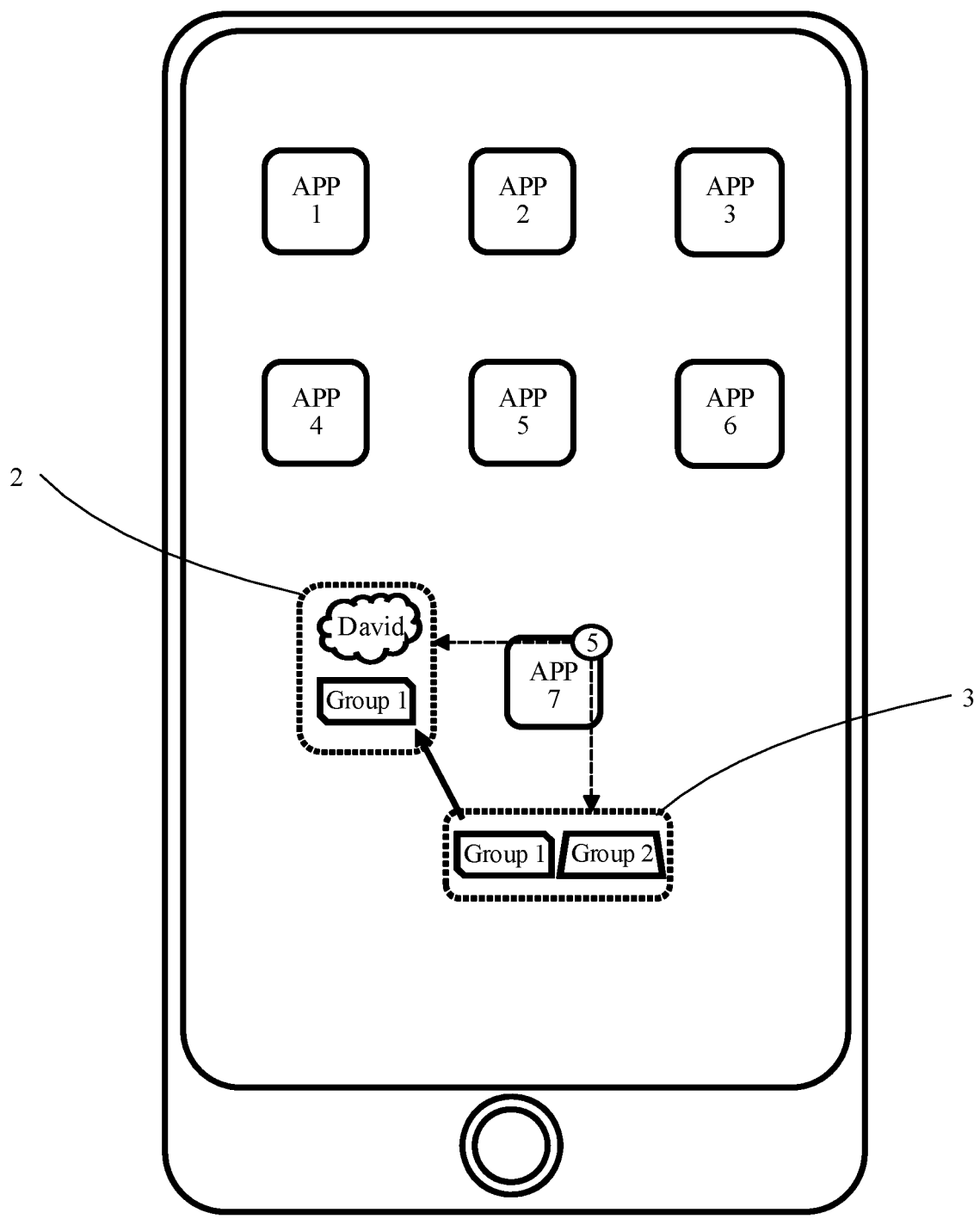
FIG. 2 is a schematic diagram of a child window generation method according to an embodiment of this application.

For example, as shown in FIG. 2, a first condition corresponding to a first window 2 corresponds to an identifier of a contact with a preset important mark, and a second condition corresponding to a second window 3 corresponds to an identifier of a contact with the unread message including a predetermined symbol and a user identifier of the user. It is assumed that current unread messages include information sent by an important contact David, information with @current user (for example, Peter) sent by an important contact Tom in a group 1, and information with @current user (for example, Peter) sent by an unimportant contact John in a group 2. The first condition corresponding to the first window 2 corresponds to an identifier of a contact with a preset important mark. Therefore, the first window 2 includes an avatar of David (David is a contact with an important mark) and an avatar of the group 1 (Tom is a contact with an important mark). The second condition corresponding to the second window 3 corresponds to an identifier of a contact with an unread message including a predetermined symbol and a user identifier of the user. Therefore, the second window 3 includes the avatar of the group 1 (Tom sends @Peter in the group 1) and an avatar of the group 2 (John sends @Peter in the group 2).

Figure 3:
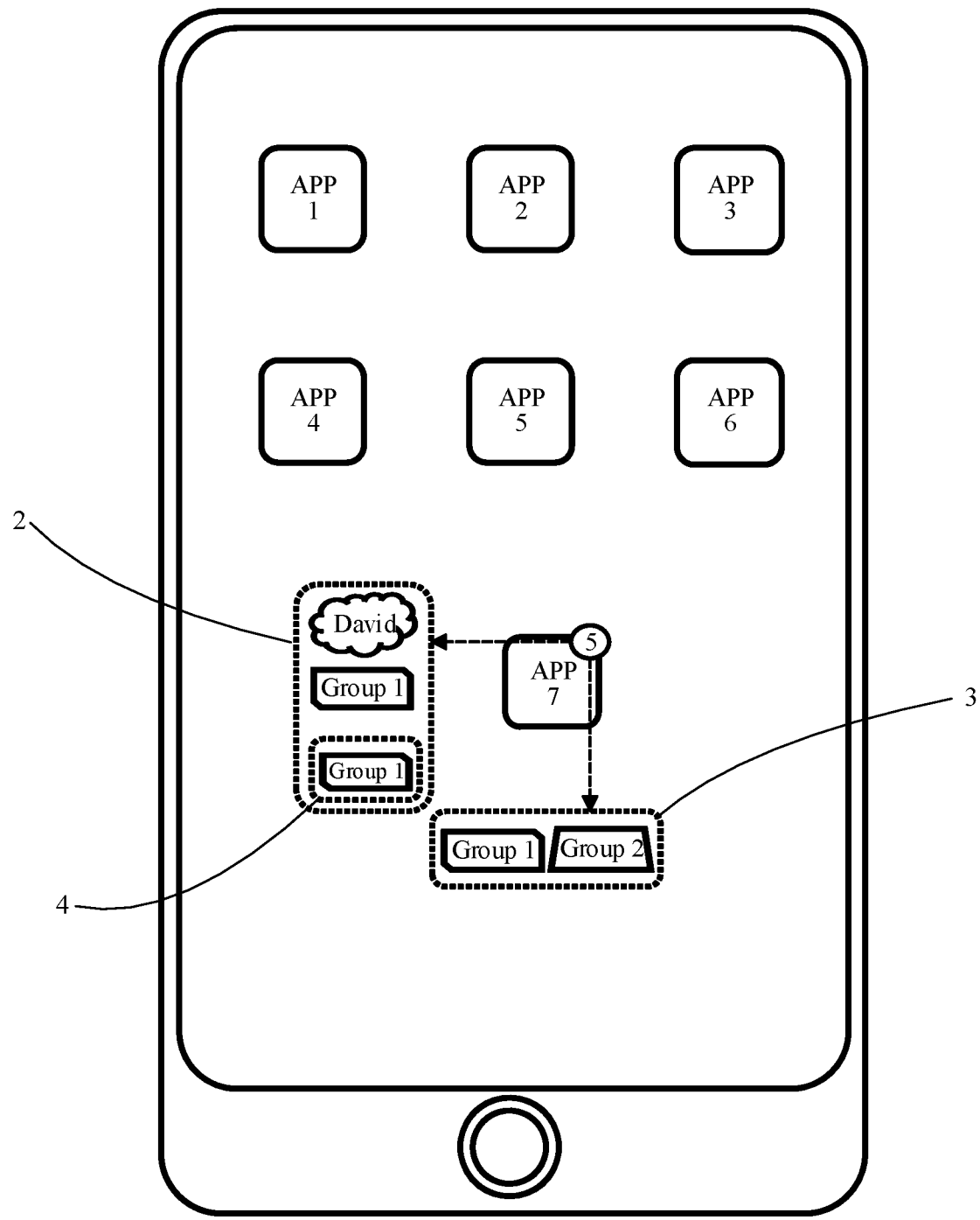
FIG. 3 is a schematic diagram of a method for displaying a child window according to an embodiment of this application.

In this case, if the user needs to view only a contact identifier of a group corresponding to a contact with a preset important mark and sending an unread message including a predetermined symbol and a user identifier of the user in the window; the user may perform a third input of dragging the second window 3 to the first window 2 (as shown in FIG. 2), so as to display a child window 4 including only the avatar of the group 1 in the first window 2 as shown in FIG. 3. In this case, because Tom not only is an important contact, but also sends information with @current user, the avatar of the corresponding group 1 is correspondingly displayed in the child window 4. However, the avatar of the group 2 in which the unimportant contact John sends @ information and the avatar of David that sends non-@, information individually are correspondingly not displayed in the child window 4.

Therefore, in this embodiment of this application, one window is dragged to another window, to generate a child window that displays a contact identifier of an unread messages meeting both the preset conditions, so that the user can sift and view unread messages more flexibly.

It may be understood that the foregoing first condition and second condition are just examples. Provided that there is an intersection set between identifiers of contacts corresponding to the two, a child window can be generated using the foregoing method, so that unread messages can be read more accurately.

Based on the foregoing embodiments of this application, the method further includes:
receiving a fourth input performed by the user on the child window; and displaying the child window at a first position in response to the fourth input.

In a case that the input direction of the first input points to the first position, the displaying an information window in response to the first input includes:
displaying the child window in response to the first input.

Specifically, after dragging the second window to the first window to generate the child window; the user can display the child window at the first position in the form of a fourth input. The fourth input, for example, is a drag operation. The first position is, for example, a position with an ending position of the drag operation as a center, which is not specifically limited in the embodiments of this application.

In addition, while the child window is displayed through the fourth input, an input manner for subsequently triggering display of the child window can also be defined, so that the user can trigger display of the child window only by pointing an input direction of the first input to the first position.

Figure 4:
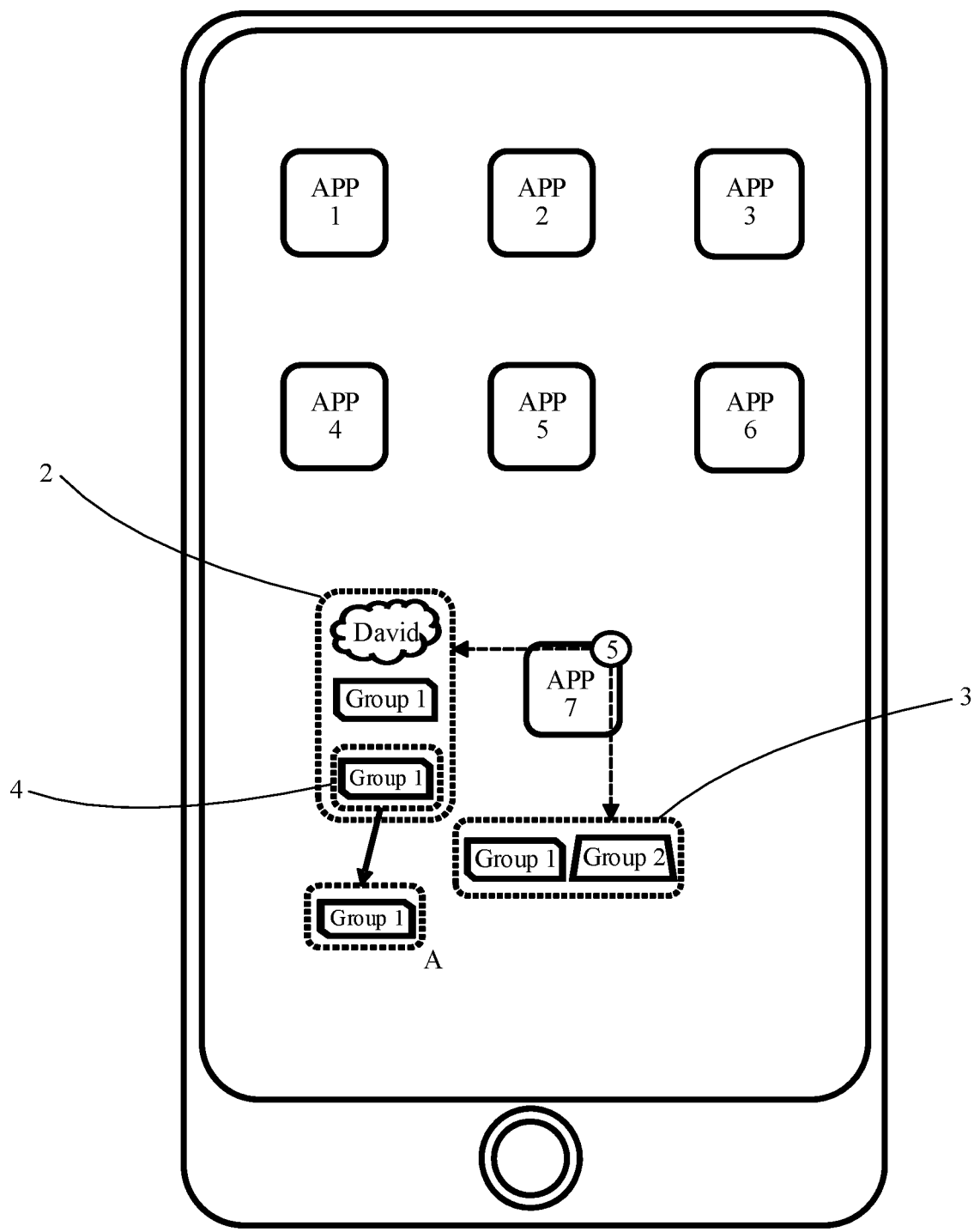
FIG. 4 is a schematic diagram of a method for independently configuring a child window according to an embodiment of this application.
Figure 5:
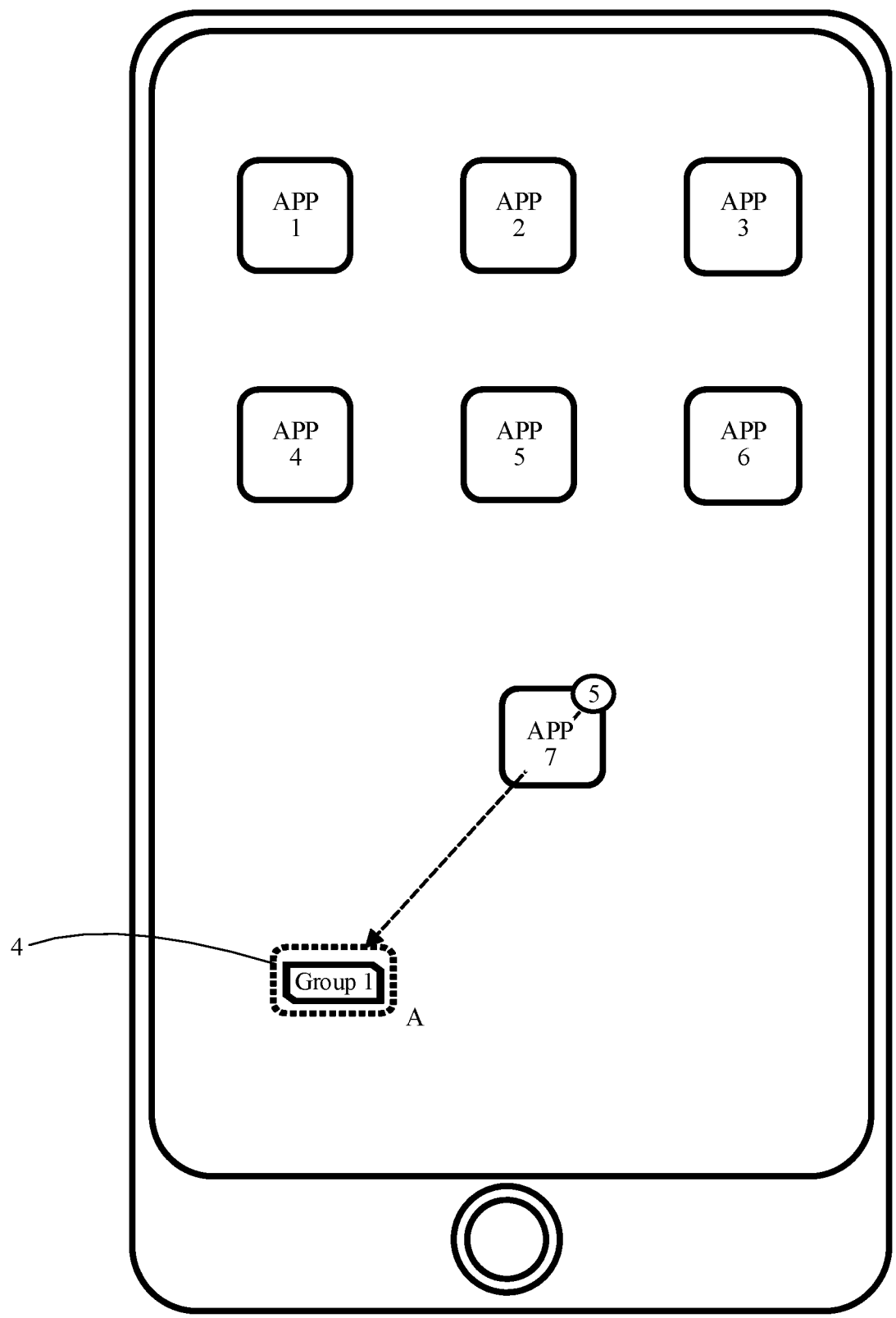
FIG. 5 is a schematic diagram of a method for displaying an independently configured child window according to an embodiment of this application.

For example, as shown in FIG. 4, the child window 4 including the avatar of the group 1 in the figure is dragged from the first window 2 to a first position A in the figure, so as to generate an independent child window 4. Based on this, for example, as shown in FIG. 5, when needing to display the child window 4 again, the user may perform a first input toward the first position A on the program corner mark. Correspondingly, after receiving the first input performed by the user on the program corner mark, the terminal displays the child window 4 at the first position A.

In this embodiment of this application, based on dragging the child window to the first position of the display region, the user is enabled to subsequently directly display, directly through the first input pointing to the first position A that is shown, an identifier of a contact corresponding to the child window defined by the first condition and the second condition, which further improve the convenience of viewing the unread message.

Based on the foregoing embodiments of this application, the method further includes:
  receiving a fifth input performed by the user on the information window; and
  displaying the information window at a second position in response to the fifth input.

The displaying an information window in response to the first input includes:
  displaying the information window in response to the first input in a case that the input direction of the first input points to the second position.

Specifically, the user may perform, according to personal usage habits and the like, a fifth input of dragging the information window to the second position B, and then change the input direction corresponding to the information window. For example, as indicated by a solid arrow shown in FIG. 6, the user drags the information window (the first window 2 is used as an example in this embodiment) to the second position B shown in the figure, the input direction triggering display of the first window 2 is changed to a direction from the program corner mark to the second position B.

Figure 6:
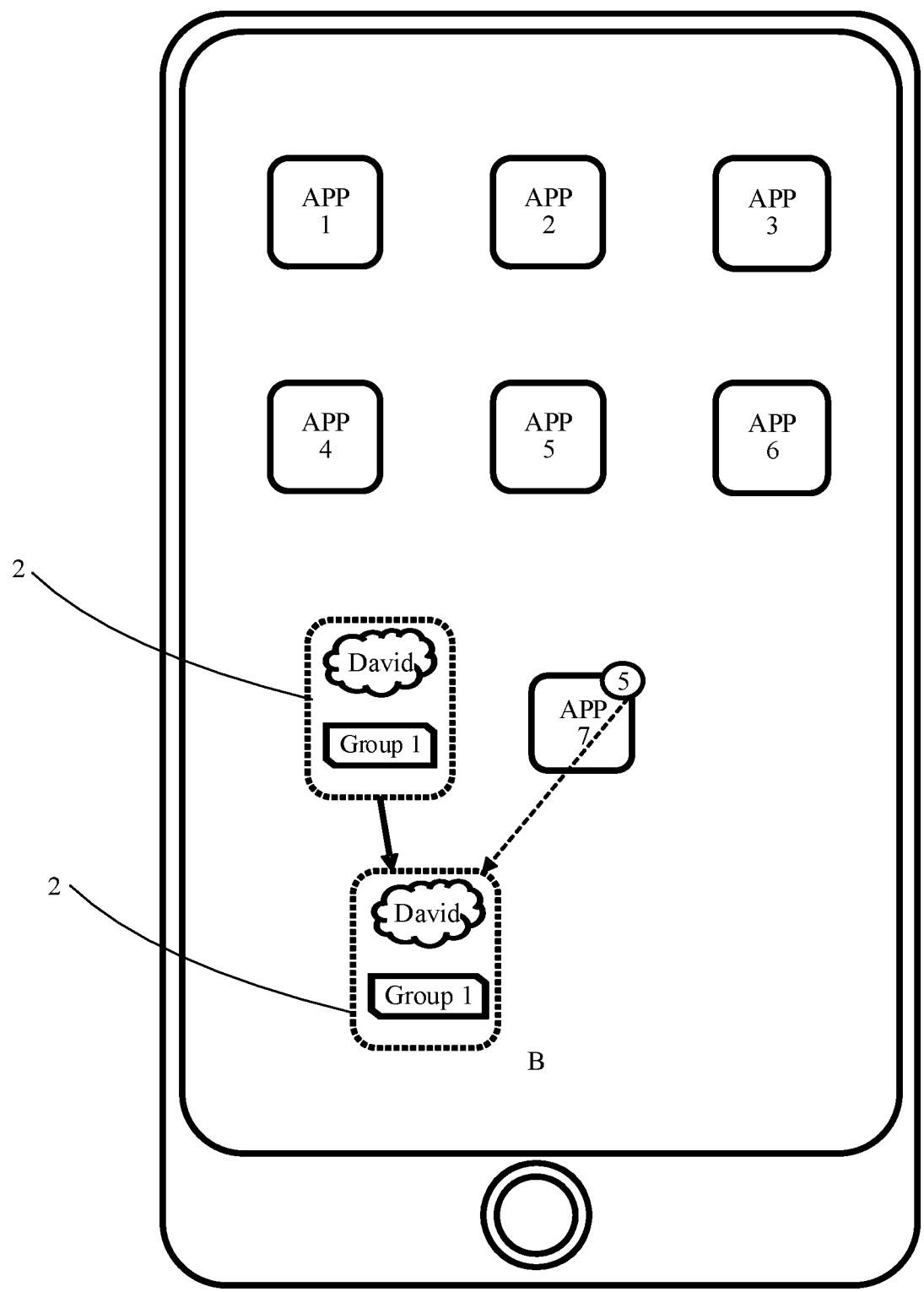
FIG. 6 is a schematic diagram of a method for adjusting an input direction corresponding to an information window according to an embodiment of this application.

Correspondingly, as indicated by a dashed arrow shown in FIG. 6, the user can input a first input with an input direction of pointing to the second position B, to invoke the first window 2 after its display position is updated to the second position B.

In this embodiment of this application, the user is enabled to perform a fifth input on the information window according to factors such as personal usage habits, to change an input direction of the first input triggering display of the information window and a display position of the information window, thereby improving the efficiency of the user viewing unread messages.

Based on the foregoing embodiments of this application, the method further includes:
  receiving a sixth input on an identifier of a fourth contact in the information window; and
  displaying a third window at a third position in response to the sixth input, where the third window includes the identifier of the fourth contact.

The displaying an information window in response to the first input includes:
  displaying the third window in response to the first input in a case that the input direction of the first input points to the third position.

Figure 7:
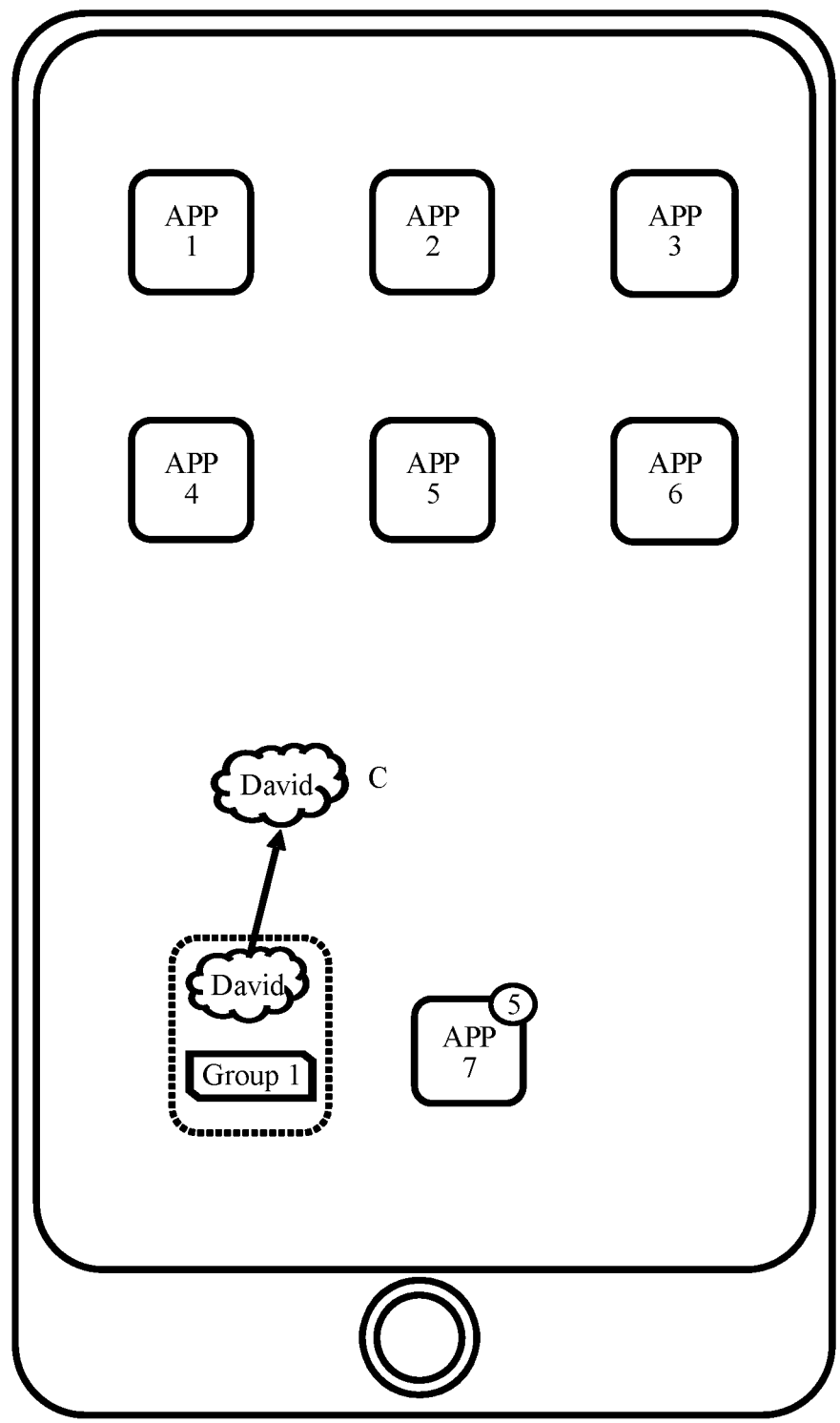
FIG. 7 is a schematic diagram of a method for setting independent display of an unread message of a contact according to an embodiment of this application.
Figure 8:
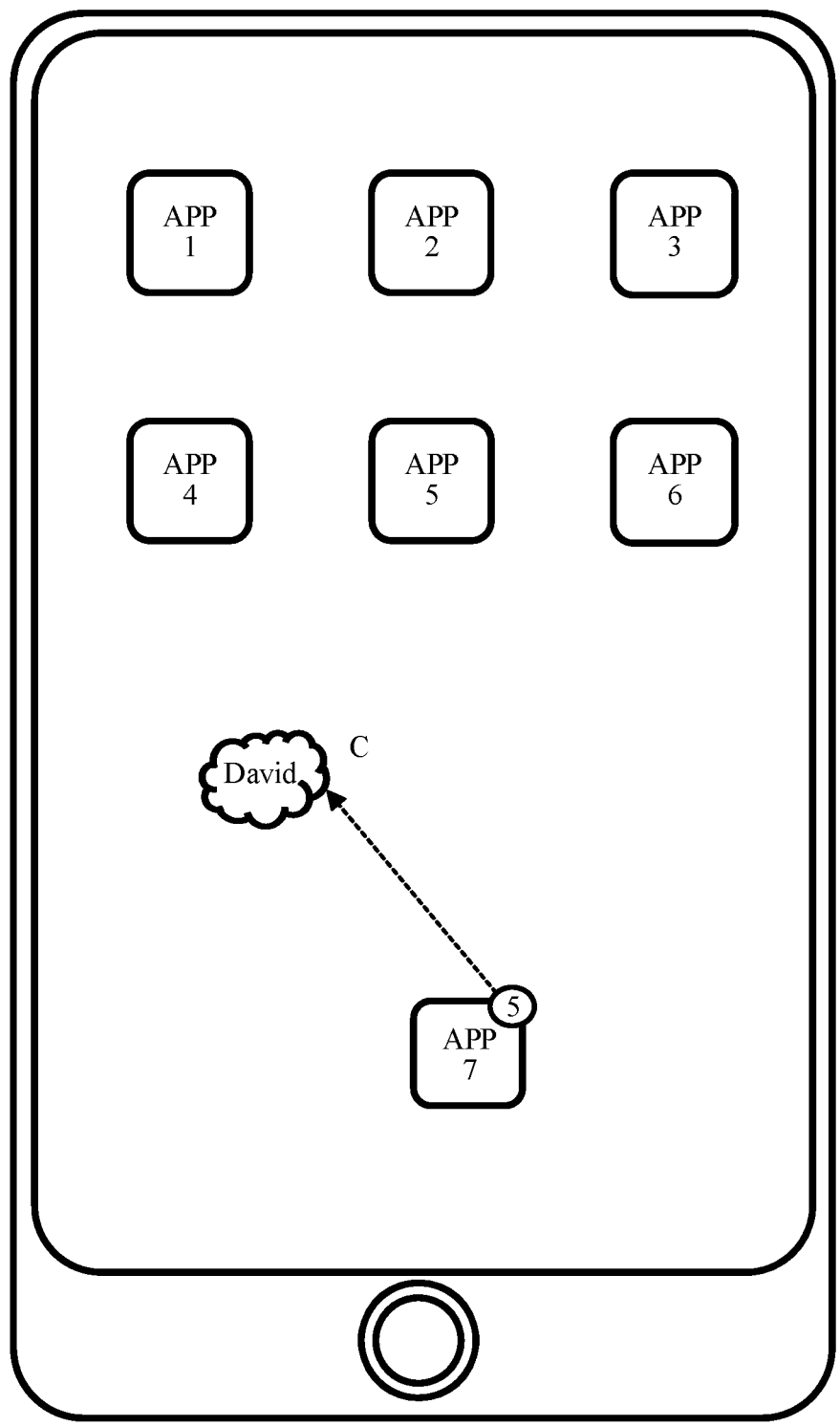
FIG. 8 is a schematic diagram of a method for displaying an unread message of a contact according to an embodiment of this application.

Specifically, when needing to view an unread message of a specific contact or
  group individually, the user may perform the sixth input to drag the identifier of the fourth contact, such as the contact or group, from the information window (in this embodiment, the first window 2 is used as an example) to the third position. As shown in FIG. 7, the user may drag the avatar of David in the information window that is shown to the third position C shown in FIG. 7. Therefore, when the user needs to view an unread message of the contact or group individually, the user can generate the third window by performing the sixth input, so that, as shown in FIG. 8, the user can invoke, through the first input pointing to the third position C, the third window that only displays the unread message from David. Based on this, this embodiment of this application further improves the flexibility of the user viewing the unread message.

Based on the foregoing embodiments of this application, the target application is located in a target folder, and the displaying a program corner mark in a case that an unread message is received through a target application includes:
  displaying the program corner mark and a folder corner mark in a case that the unread message is received through the target application.

Before the receiving a first input performed by a user on the program corner mark, the method further includes:
  receiving a seventh input performed by the user on the folder corner mark of the target folder; and
  displaying a program window in response to the seventh input, where the program window includes a program icon of the target application, and the program corner mark is displayed on the program icon.

Specifically, for a folder including one or more applications, if the specific unread message exists in the one or more applications, a folder corner mark is displayed on the folder and used for presenting a sum of unread messages of all the applications in the folder, a quantity of applications in which an unread message exists, or the like.

When the user observes that there is a folder corner mark on the folder, if the user directly opens the folder, the user needs to check the program icons in the folder one by one to ensure that an application in which an unread message exists is not missed. When there are many applications, such a checking process is relatively cumbersome, and even requires to perform an operation, such as a slide or a page flip, to ensure that all the applications have been checked for whether an unread message exists.

For this, in this embodiment of this application, the user may perform the seventh input on the folder corner mark of the target folder. Correspondingly, when receiving the seventh input, the terminal displays a program window in response to the seventh input, displays and includes a program icon of the target application in the program window; and displays the program corner mark on the program icon. Therefore, the user can directly view a program identifier of an application with an unread message in the displayed program window, thereby avoiding interference of another application without an unread message.

In addition, to further enhance the convenience of a use process of the user, in this embodiment of this application, the program corner mark as described above is displayed on the program identifier of the application in the display program window; so that the user can directly perform the same operation on the program corner mark in this program window, to display identification information of the target contact meeting the preset condition in the application.

Based on the foregoing embodiments of this application, the method further includes:
  receiving an eighth input performed by the user on the program corner mark; and
  deleting the program corner mark in response to the eighth input, where the eighth input and the first input have different directions.

Specifically, if the user learns from the first input that there is no need to browse information in the unread message, or there is no need to continue performing prompting through the program corner mark because the user already learns a situation of current unread messages, the user can perform the eighth input on the program corner mark, so as to delete the program corner mark on the program icon, without having to delete the program corner mark by opening all unread messages one by one after entering the program, thereby further improving the convenience of the user during use. The eighth input may be performed in an input manner, such as a slide, the same as that of the first input, but to distinguish the eighth input from the first input, a different input direction needs to be used.

Based on the foregoing embodiments of this application, the method further includes:
receiving a ninth input of dragging, by the user, the information window to the program icon of the target application; and
deleting the information window in response to the ninth input.

Specifically, when the user does not need to display the information window any more, the user can drag the information window through the ninth input to the program icon corresponding to the program corner mark, so as to delete the information window.

It may be understood that, because to a size of the information window or child window may not be the same as that of the program icon, based on the foregoing embodiments of this application, the deleting the information window in response to the ninth input includes:
deleting the information window in response to the ninth input in a case that an overlapping area between the information window and the program icon reaches a preset threshold.

The preset threshold may be determined according to factors such as operations during actual use and a screen size of the terminal, which is not specifically limited in the embodiments of this application.

A method for displaying an unread message according to still another embodiment of this application is exemplified below. The method includes the following steps.

Step 1: A user selectively sets an "Important person" list.

Figure 9:
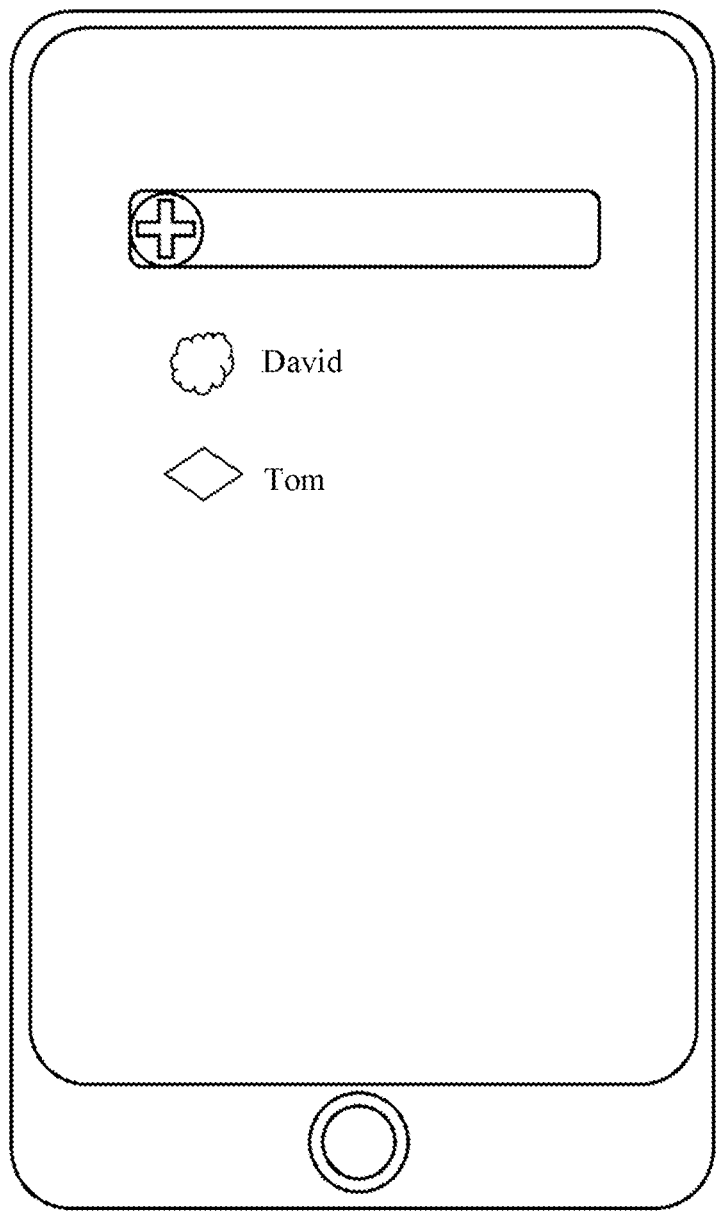
FIG. 9 is a schematic diagram of an interface operation of setting an important mark for an important contact according to an embodiment of this application.

As shown in FIG. 9, "Important person" is set in the setting interface of the terminal. In the setting interface, a search box and a plus button box shown in the figure are set for searching for and setting "Important person", and an important person list is displayed below the search box. For example, David with an avatar including a cloud and Tom with an avatar including a diamond are set as "Important person", and correspondingly, in the application, an important mark is added to David and Tom.

Step 2: Parse the unread message to obtain necessary data.

Because the unread message is an information set of all application interaction objects, such data needs to be decomposed and classified, and then, a corresponding avatar list is generated.

Step 3. Define a moving direction of a program corner mark and a corresponding implemented function.

Moving directions of the program corner mark and corresponding implemented functions shown in the following table are defined in this embodiment of this application, but correspondences are not limited thereto and can be set according to actual needs, and such correspondence data is stored in a database of the terminal, making it convenient to display corresponding information according to a direction of an operation when the user performs the operation the program corner mark.

| Moving direction of program corner mark | Implemented function |
| --- | --- |
| Leftward | Display an avatar list of important persons with an unread message |
| Rightward | Cancel display of a program corner mark for an unread message |
| Upward | Display a contact avatar list of a contact or a contact of a group with an unread message |
| Downward | Display a contact avatar list of a group to which a contact sending @user belongs |

In addition, a corresponding interface interaction link is generated for the avatar list, and a cited corresponding interactive interface can be jumped to when the user clicks the link. When there is no corresponding data for a function implemented in a corresponding direction, a prompt like "No data for this function" can be directly provided to the user.

Step 4: Determine a moving direction of the program corner mark and implement a corresponding function of displaying information or removing the program corner mark.

Figure 10:
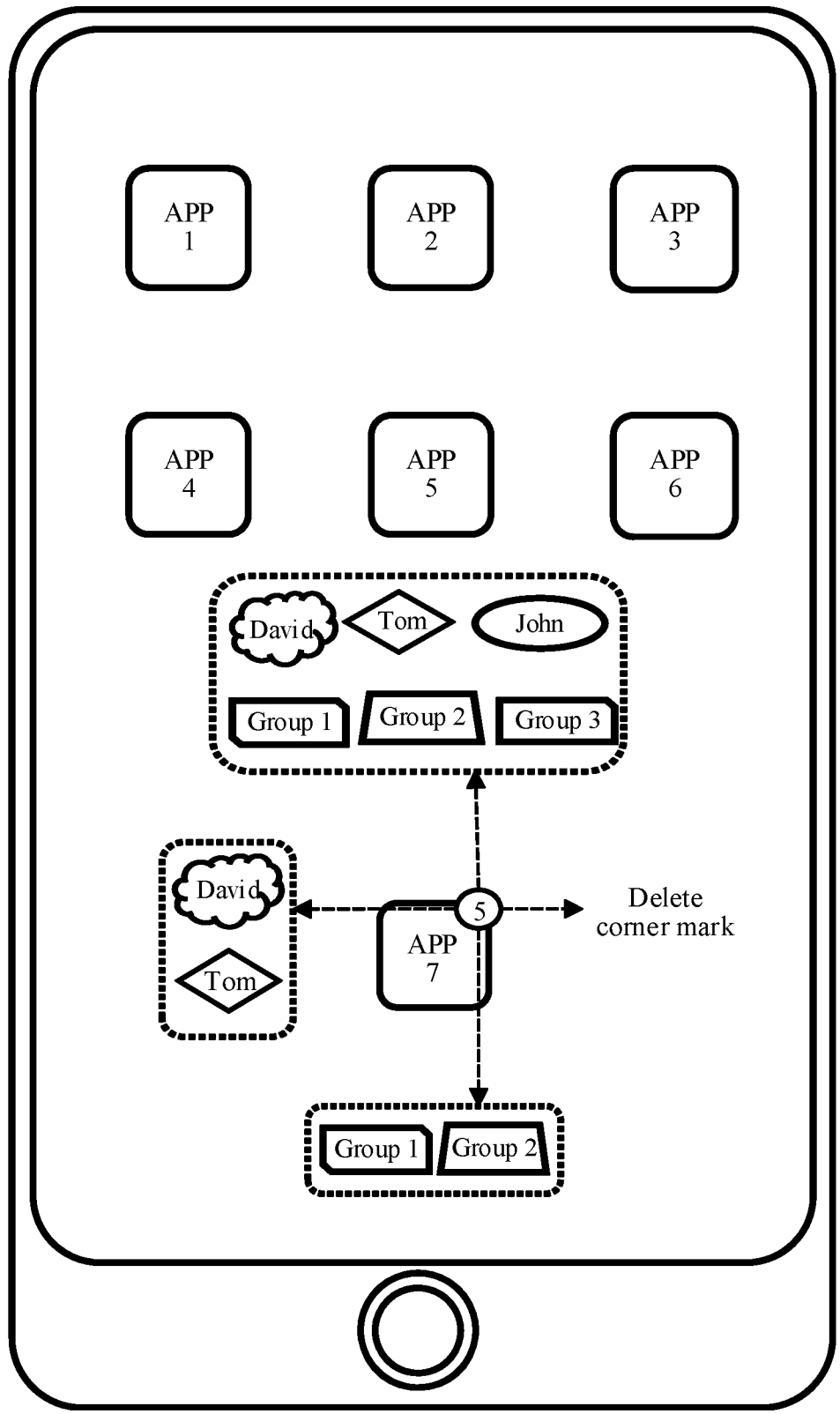
FIG. 10 is a schematic diagram of an interface operation of a method for displaying an unread message according to an embodiment of this application.

After the function database that can be referred to by the user for moving the corner mark, when the user uses a mobile phone, the terminal determines a direction in which the user moves the program corner mark, searches the database, obtains data of an implemented function, and jumps to a corresponding interface. FIG. 10 shows a user interface displaying corresponding functions when the corner mark is moved in various directions.

Figure 11:
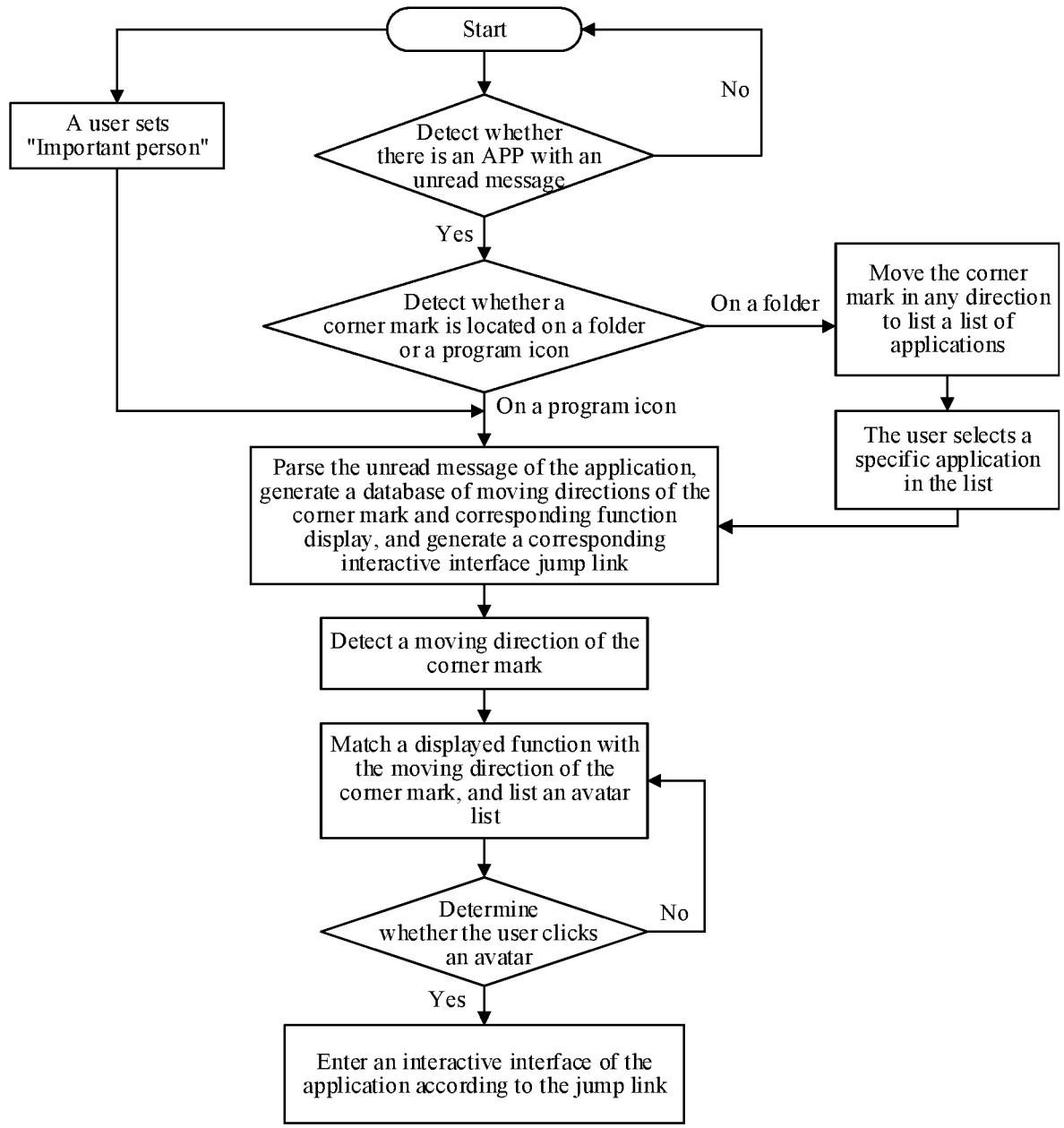
FIG. 11 is a method flowchart of a method for displaying an unread message according to another embodiment of this application.

FIG. 11 is a method flowchart of a method for displaying an unread message according to another embodiment of this application, to exemplify the method for displaying an unread message according to the foregoing embodiments of this application.

As shown in FIG. 11, the terminal detects whether there is an unread message in an installed APP, and continues performing detection if there is no unread message at present: continues, if an unread message is detected, to determine whether the APP with the unread message is individually set on a user interface or is set together with other programs in a folder, and displays a folder corner mark according to a quantity of unread messages if the APP is in a folder; and displays a program corner mark according to the quantity of unread messages if the APP is not in a folder.

In a case the folder corner mark is displayed, the user drags the folder corner mark to move in any direction, and then, a list of applications receiving unread messages in the file folder is listed. After the user selects a specific application in the list, the unread message of the application is parsed, a database of moving directions of the corner mark and corresponding function display is generated, and a corresponding interactive interface jump link is generated.

In a case that a program corner mark is displayed, the unread message of the application is parsed, a database of moving directions of the corner mark and corresponding function display is generated, and a corresponding interactive interface jump link is generated.

Then, a direction in which the user drags the program corner mark is detected, a displayed function is matched with the moving direction of the program corner mark, and an avatar list is listed. It is determined whether the user clicks an avatar in the avatar list, and if the user clicks the avatar, an interactive interface of the application is entered according to the jump link.

It should be noted that the method for displaying an unread message provided in the embodiments of this application can be performed by an apparatus for displaying an unread message or a control module configured to perform and load the method for displaying an unread message in the apparatus for displaying an unread message. In the embodiments of this application, an apparatus for displaying an unread message provided in the embodiments of this application is described by using an example in which the apparatus for displaying an unread message performs and loads the method for displaying an unread message.

Figure 12:
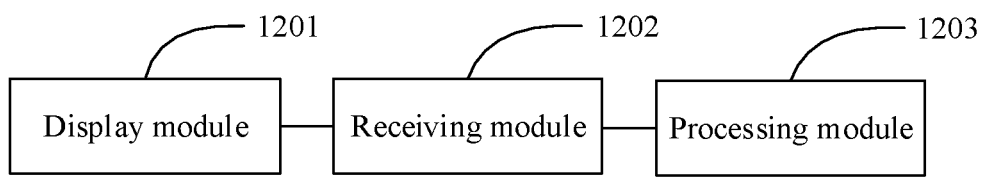
FIG. 12 is a schematic structural diagram of an apparatus for displaying an unread message according to an embodiment of this application.

FIG. 12 is a schematic structural diagram of an apparatus for displaying an unread message according to an embodiment of this application. As shown in FIG. 12, the apparatus for displaying an unread message includes:

a display module 1201, configured to display a program corner mark in a case that an unread message is received through a target application;

a receiving module 1202, configured to receive a first input performed by a user on the program corner mark; and a processing module 1203, configured to display an information window in response to the first input, where the information window includes an identifier of a target contact, the target contact is a contact meeting a preset condition in contacts corresponding to the unread message, and the preset condition is associated with an input direction of the first input, where the receiving module 1202 is further configured to receive a second input performed by the user on the identifier of the target contact; and the processing module 1203 is further configured to start the target application in response to the second input, and display a user interface of the target application, where the user interface includes message content corresponding to the identifier of the target contact.

Based on the foregoing embodiments of this application, the identifier of the target contact meeting the preset condition includes at least one of the following: an identifier of a contact with a preset important mark, a group identifier of a contact that is a group, an identifier of a contact with the unread message including a predetermined symbol and a user identifier of the user, or an identifier of a contact corresponding to the unread message.

Based on the foregoing embodiments of this application, a display position of the information window is associated with the input direction of the first input.

Based on the foregoing embodiments of this application, the first input includes a first sub-input and a second sub-input, the preset condition includes a first condition and a second condition, and the displaying an information window includes displaying a first window and a second window. The first window includes an identifier of a first contact, and the first contact is a contact meeting the first condition in the contacts corresponding to the unread message. The first condition is associated with an input direction of the first sub-input. The second window includes an identifier of a second contact, and the second contact is a contact meeting the second condition in the contacts corresponding to the unread message. The second condition is associated with an input direction of the second sub-input.

The receiving module 1202 is further configured to receive a third input of dragging the second window to the first window.

The processing module 1203 is further configured to display a child window in the first window in response to the third input, where the child window includes an identifier of a third contact, where the third contact meets the first condition and the second condition.

Based on the foregoing embodiments of this application, the receiving module 1202 is further configured to receive a fourth input performed by the user on the child window.

The processing module 1203 is further configured to display the child window at a first position in response to the fourth input.

In a case that the input direction of the first input points to the first position, the displaying an information window in response to the first input includes:

displaying the child window in response to the first input.

Based on the foregoing embodiments of this application, the receiving module 1202 is further configured to receive a fifth input performed by the user on the information window.

The processing module 1203 is further configured to display the information window at a second position in response to the fifth input.

The displaying an information window in response to the first input includes:

displaying the information window in response to the first input in a case that the input direction of the first input points to the second position.

Based on the foregoing embodiments of this application, the receiving module 1202 is further configured to receive a sixth input on an identifier of a fourth contact in the information window.

The processing module 1203 is further configured to display a third window at a third position in response to the sixth input, where the third window includes the identifier of the fourth contact.

The displaying an information window in response to the first input includes:

displaying the third window in response to the first input in a case that the input direction of the first input points to the third position.

Based on the foregoing embodiments of this application, the target application is located in a target folder, and the display module 1201 is further configured to display the program corner mark and a folder corner mark in a case that the unread message is received through the target application.

The receiving module 1202 is further configured to receive, before receiving the first input performed by the user on the program corner mark, a seventh input performed by the user on the folder corner mark of the target folder.

The processing module 1203 is further configured to display a program window in response to the seventh input, where the program window includes a program icon of the target application, and the program corner mark is displayed on the program icon.

Based on the foregoing embodiments of this application, the receiving module 1202 is further configured to receive an eighth input performed by the user on the program corner mark.

The processing module 1203 is further configured to delete the program corner mark in response to the eighth input, where the eighth input and the first input have different directions.

Based on the foregoing embodiments of this application, the receiving module 1202 is further configured to receive a ninth input of dragging, by the user, the information window to the program icon of the target application.

The processing module 1203 is further configured to delete the information window in response to the ninth input.

Based on the foregoing embodiments of this application, the deleting the information window in response to the ninth input includes:

deleting the information window in response to the ninth input in a case that an overlapping area between the information window and the program icon reaches a preset threshold.

The apparatus for displaying an unread message in the embodiments of this application may also be a component, an integrated circuit, or a chip in a terminal. The apparatus may be a mobile electronic device or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The apparatus for displaying an unread message in the embodiments of this application may be an apparatus with an operating system. The operating system may be an Android operating system, may be an iOS operating system, or may be another possible operating system, and is not specifically limited in the embodiments of this application.

The apparatus for displaying an unread message provided in the embodiments of this application can implement various processes implemented by the apparatus for displaying an unread message in the foregoing method embodiments. To avoid repetition, details are not described herein again.

Figure 13:
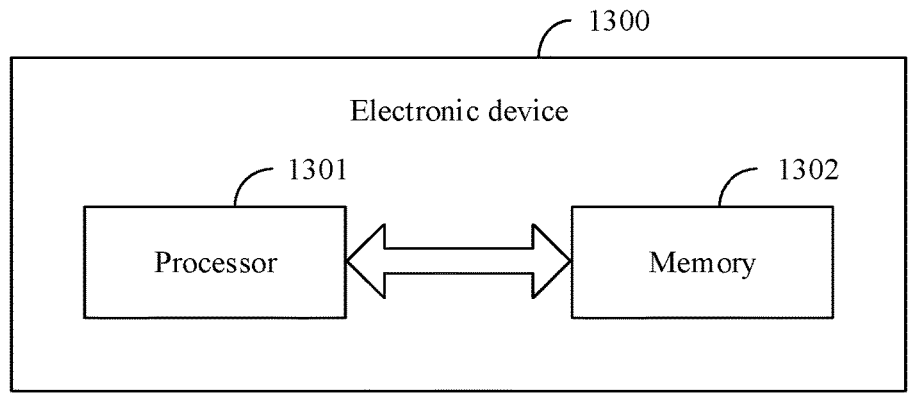
FIG. 13 is a schematic structural diagram of an electronic device according to an embodiment of this application.

Optionally, as shown in FIG. 13, the embodiments of this application further provide an electronic device 1300, including a processor 1301, a memory 1302, and a program or instructions stored in the memory 1302 and executable on the processor 1301, where the program or instructions, when executed by the processor 1301, implement the processes of the foregoing embodiments of the method for displaying an unread message, and can achieve the same technical effects. To avoid repetition, details are not described herein again.

It should be noted that the electronic device in the embodiments of this application may include the mobile electronic device and the non-mobile electronic device.

Figure 14:
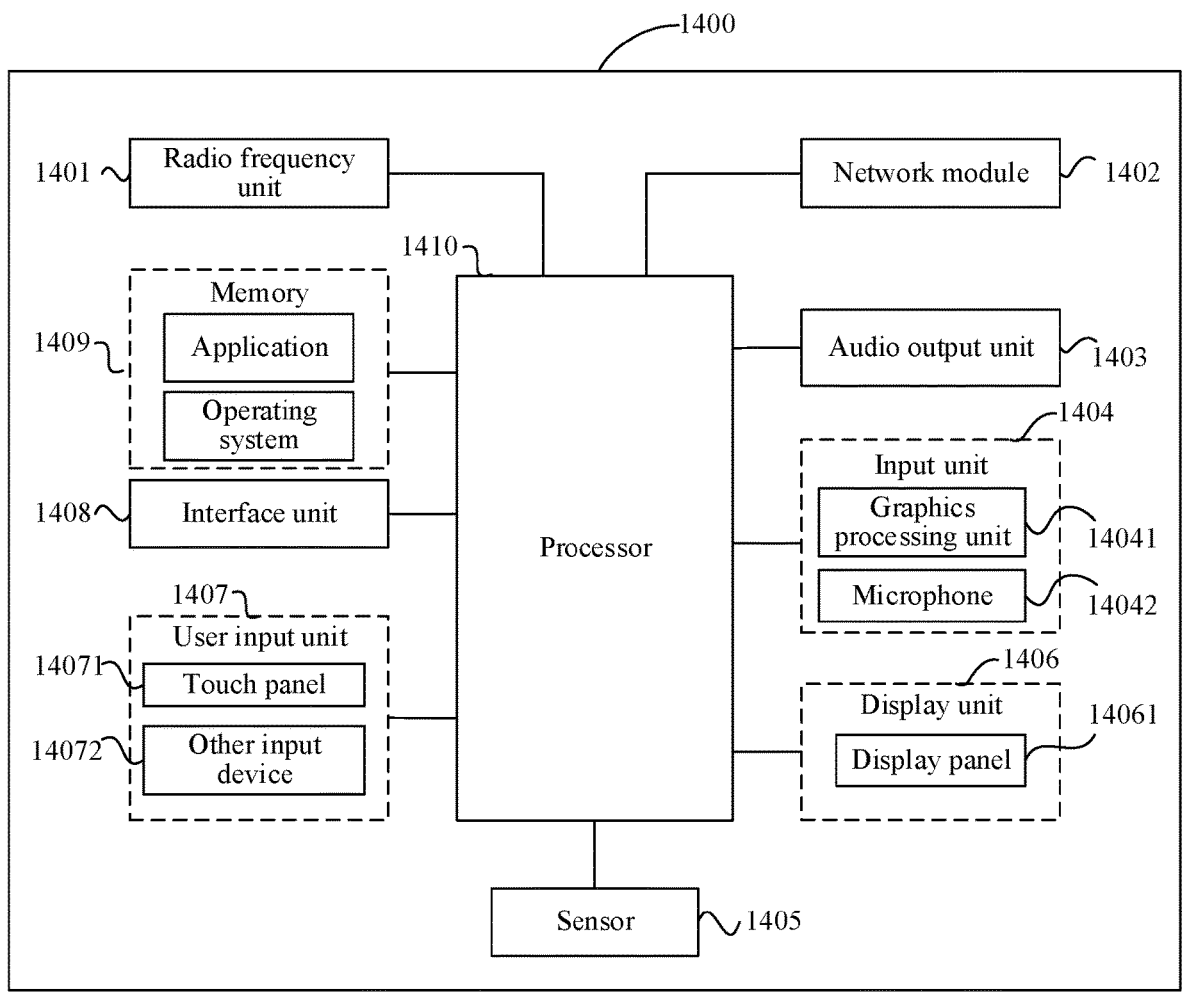
FIG. 14 is a schematic structural diagram of an electronic device according to still another embodiment of this application.

FIG. 14 is a schematic structural diagram of hardware of an electronic device according to still another embodiment of this application. As shown in FIG. 14, the electronic device is a first electronic device or a second electronic device. The electronic device 1400 includes, but is not limited to, components such as a radio frequency unit 1401, a network module 1402, an audio output unit 1403, an input unit 1404, a sensor 1405, a display unit 1406, a user input unit 1407, an interface unit 1408, a memory 1409, and a processor 1410.

A person skilled in the art may understand that the electronic device 1400 may further include a power supply (such as a battery) for supplying power to the components. The power supply may be logically connected to the processor 1410 by a power supply management system, thereby implementing functions, such as charging, discharging, and power consumption management, by using the power supply management system. The structure of the electronic device shown in FIG. 14 constitutes no limitation on the electronic device, and the electronic device may include more or fewer components than those shown in the figure, or some components may be combined, or a different component deployment may be used. Details are not described herein again.

The radio frequency unit 1401 is configured to receive a first input performed by a user on the program corner mark.

The processor 1410 is configured to display an information window in a display region in response to the first input, where the information window includes a contact identifier of a contact and/or a contact identifier of a group corresponding to a sifted unread message.

It should be noted that the electronic device 1400 in this embodiment can implement processes of the method embodiments in the embodiments of this application, and can achieve the same technical effects. To avoid repetition, details are not described herein again.

It should be understood that, in the embodiments of this application, the input unit 1404 may include a graphics processing unit (GPU) 14041 and a microphone 14042. The graphics processing unit 14041 processes image data of a static picture or a video obtained by an image capturing apparatus (for example, a camera) in a video capturing mode or an image capturing mode. The display unit 1406 may include a display panel 14061, and the display panel 14061 may be configured in a form such as a liquid crystal display or an organic light-emitting diode. The user input unit 1407 includes a touch panel 14071 and another input device 14072. The touch panel 14071 is also referred to as a touchscreen. The touch panel 14071 may include two parts: a touch monitoring apparatus and a touch controller. The another input device 14072 may include, but not limited to, a physical keyboard, a functional key (such as a volume control key or a switch key), a track ball, a mouse, and a joystick, which is not described herein in detail. The memory 1409 may be configured to store a software program and various data, including, but not limited to, an application and an operating system. The processor 1410 may integrate an application processor and a modem processor. The application processor mainly processes an operating system, a user interface, an application, and the like. The modem processor mainly processes wireless communication. It may be understood that the modulation and demodulation processor may not be integrated into the processor 1410.

The embodiments of this application further provide a readable storage medium. The readable storage medium stores a program or instructions. The program or instructions, when executed by a processor, implement the processes of the foregoing embodiments of the method for displaying an unread message and can achieve the same technical effects. To avoid repetition, details are not described herein again.

The processor is a processor in the electronic device in the foregoing embodiments. The readable storage medium includes a computer-readable storage medium such as a computer read-only memory (ROM), a random access memory (RAM), a magnetic disk, or an optical disc.

The embodiments of this application further provide a chip, including a processor and a communication interface, where the communication interface is coupled to the processor, and the processor is configured to execute a program or instructions, to implement processes of the embodiments of the foregoing method for displaying an unread message, and can achieve the same technical effects. To avoid repetition, details are not described herein again.

It should be noted that, the chip mentioned in the embodiments of this application may also be referred to as a system-level chip, a system chip, a chip system, a system on chip, or the like.

It may be understood that the embodiments described in the present disclosure may be implemented by hardware, software, firmware, middleware, microcode, or a combination thereof. For hardware implementation, modules, units, submodules, and subunits may be implemented in one or more application-specific integrated circuits (ASIC), a digital signal processor (DSP), a digital signal processing device (DSP Device, DSPD), a programmable logic device (PLD), a field-programmable gate array (FPGA), a general purpose processor, a controller, a micro-controller, a microprocessor, and other electronic units configured to execute the functions in this application, or a combination of the above.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by a sentence "including one" does not exclude that there are still other same elements in the process, method, object, or apparatus. Besides, it should be noted that ranges of the method and apparatus in the implementations of this application are not limited to implementing functions in an order shown or discussed, but may include implementing functions according to the included functions in a substantially simultaneous manner or in a reverse order, for example, the described method may be performed in an order different than the described order. In addition, various steps may also be added, omitted, or combined. In addition, features described with reference to some examples may also be combined in other examples.

Through the descriptions of the foregoing implementations, a person skilled in the art may clearly understand that the method according to the foregoing embodiments may be implemented through software and a necessary general hardware platform, and certainly, may also be implemented by hardware, but in many cases, the former manner is a better implementation. Based on such an understanding, the technical solutions of this application essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of this application.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A method for displaying an unread message, comprising:
   displaying a program corner mark in a case that an unread message is received through a target application;
   receiving a first input performed by a user on the program corner mark; wherein the first input is a slide input starting from the program corner mark toward a preset direction;
   displaying an information window in response to the first input, wherein the information window comprises an identifier of a target contact, the target contact is a contact meeting a preset condition in contacts corresponding to the unread message, and the preset condition is associated with the preset direction; wherein in response to different preset directions, different identifiers of target contacts are displayed in the information window;
   receiving a second input performed by the user on the identifier of the target contact; and
   starting the target application in response to the second input, and displaying a user interface of the target application, wherein the user interface comprises message content corresponding to the identifier of the target contact.

2. The method for displaying an unread message according to claim 1, wherein
   the identifier of the target contact meeting the preset condition comprises at least one of the following: an identifier of a contact with a preset important mark, a group identifier of a contact that is a group, an identifier of a contact with the unread message comprising a predetermined symbol and a user identifier of the user, or an identifier of a contact corresponding to the unread message.

3. The method for displaying an unread message according to claim 1, wherein a display position of the information window is associated with the preset direction.

4. The method for displaying an unread message according to claim 1, wherein
   the first input comprises a first sub-input and a second sub-input, the preset condition comprises a first condition and a second condition, and the displaying an information window comprises displaying a first window and a second window; the first window comprises an identifier of a first contact, and the first contact is a contact meeting the first condition in the contacts corresponding to the unread message; the first condition is associated with an input direction of the first sub-input; the second window comprises an identifier of a second contact, and the second contact is a contact meeting the second condition in the contacts corresponding to the unread message; the second condition is associated with an input direction of the second sub-input; and
   the method further comprises:
   receiving a third input of dragging the second window to the first window; and
   displaying a child window in the first window in response to the third input, wherein the child window comprises an identifier of a third contact, wherein the third contact meets the first condition and the second condition.

5. The method for displaying an unread message according to claim 4, wherein the method further comprises:
   receiving a fourth input performed by the user on the child window; and
   displaying the child window at a first position in response to the fourth input; and in a case that the preset direction points to the first position, the displaying an information window in response to the first input comprises:
displaying the child window in response to the first input.

6. The method for displaying an unread message according to claim 1, wherein the method further comprises:
receiving a fifth input performed by the user on the information window; and
displaying the information window at a second position in response to the fifth input; and
the displaying an information window in response to the first input comprises:
displaying the information window in response to the first input in a case that the preset direction points to the second position.

7. The method for displaying an unread message according to claim 1, wherein the method further comprises:
receiving a sixth input on an identifier of a fourth contact in the information window; and
displaying a third window at a third position in response to the sixth input, wherein the third window comprises the identifier of the fourth contact; and
the displaying an information window in response to the first input comprises:
displaying the third window in response to the first input in a case that the preset direction points to the third position.

8. The method for displaying an unread message according to claim 1, wherein the target application is located in a target folder, and the displaying a program corner mark in a case that an unread message is received through a target application comprises: displaying the program corner mark and a folder corner mark in a case that the unread message is received through the target application; and
before the receiving a first input performed by a user on the program corner mark, the method further comprises:
receiving a seventh input performed by the user on the folder corner mark of the target folder; and
displaying a program window in response to the seventh input, wherein the program window comprises a program icon of the target application, and the program corner mark is displayed on the program icon.

9. The method for displaying an unread message according to claim 1, wherein the method further comprises:
receiving an eighth input performed by the user on the program corner mark; and
deleting the program corner mark in response to the eighth input, wherein the eighth input and the first input have different directions.

10. The method for displaying an unread message according to claim 1, wherein the method further comprises:
receiving a ninth input of dragging, by the user, the information window to the program icon of the target application; and
deleting the information window in response to the ninth input.

11. An electronic device, comprising a memory, a processor, and a program or instructions stored in the memory and executable on the processor, wherein the processor, when executing the program or instructions, implements the steps of a method for displaying an unread message, comprising:
displaying a program corner mark in a case that an unread message is received through a target application;
receiving a first input performed by a user on the program corner mark; wherein the first input is a slide input starting from the program corner mark toward a preset direction;
displaying an information window in response to the first input, wherein the information window comprises an identifier of a target contact, the target contact is a contact meeting a preset condition in contacts corresponding to the unread message, and the preset condition is associated with the preset direction; wherein in response to different preset directions, different identifiers of target contacts are displayed in the information window;
receiving a second input performed by the user on the identifier of the target contact; and
starting the target application in response to the second input, and displaying a user interface of the target application, wherein the user interface comprises message content corresponding to the identifier of the target contact.

12. The electronic device according to claim 11, wherein the identifier of the target contact meeting the preset condition comprises at least one of the following: an identifier of a contact with a preset important mark, a group identifier of a contact that is a group, an identifier of a contact with the unread message comprising a predetermined symbol and a user identifier of the user, or an identifier of a contact corresponding to the unread message.

13. The electronic device according to claim 11, wherein a display position of the information window is associated with the preset direction.

14. The electronic device according to claim 11, wherein the first input comprises a first sub-input and a second sub-input, the preset condition comprises a first condition and a second condition, and the displaying an information window comprises displaying a first window and a second window; the first window comprises an identifier of a first contact, and the first contact is a contact meeting the first condition in the contacts corresponding to the unread message; the first condition is associated with an input direction of the first sub-input; the second window comprises an identifier of a second contact, and the second contact is a contact meeting the second condition in the contacts corresponding to the unread message; the second condition is associated with an input direction of the second sub-input; and
the method further comprises:
receiving a third input of dragging the second window to the first window; and
displaying a child window in the first window in response to the third input, wherein the child window comprises an identifier of a third contact, wherein the third contact meets the first condition and the second condition.

15. The electronic device according to claim 14, wherein the method further comprises:
receiving a fourth input performed by the user on the child window; and
displaying the child window at a first position in response to the fourth input; and
in a case that the preset direction points to the first position, the displaying an information window in response to the first input comprises:
displaying the child window in response to the first input.

16. The electronic device according to claim 11, wherein the method further comprises:

receiving a fifth input performed by the user on the information window; and displaying the information window at a second position in response to the fifth input; and the displaying an information window in response to the first input comprises:

displaying the information window in response to the first input in a case that the preset direction points to the second position.

17. The electronic device according to claim 11, wherein the method further comprises:

receiving a sixth input on an identifier of a fourth contact in the information window; and displaying a third window at a third position in response to the sixth input, wherein the third window comprises the identifier of the fourth contact; and the displaying an information window in response to the first input comprises:

displaying the third window in response to the first input in a case that the preset direction points to the third position.

18. The electronic device according to claim 11, wherein the target application is located in a target folder, and the displaying a program corner mark in a case that an unread message is received through a target application comprises:

displaying the program corner mark and a folder corner mark in a case that the unread message is received through the target application; and before the receiving a first input performed by a user on the program corner mark, the method further comprises:

receiving a seventh input performed by the user on the folder corner mark of the target folder; and displaying a program window in response to the seventh input, wherein the program window comprises a program icon of the target application, and the program corner mark is displayed on the program icon.

19. The electronic device according to claim 11, wherein the method further comprises:

receiving an eighth input performed by the user on the program corner mark; and deleting the program corner mark in response to the eighth input, wherein the eighth input and the first input have different directions.

20. A non-transitory readable storage medium, storing a program or instructions, wherein the program or instructions, when executed by a processor, implement the steps of a method for displaying an unread message, comprising:

displaying a program corner mark in a case that an unread message is received through a target application;

receiving a first input performed by a user on the program corner mark; wherein the first input is a slide input starting from the program corner mark toward a preset direction;

displaying an information window in response to the first input, wherein the information window comprises an identifier of a target contact, the target contact is a contact meeting a preset condition in contacts corresponding to the unread message, and the preset condition is associated with the preset direction; wherein in response to different preset directions, different identifiers of target contacts are displayed in the information window;

receiving a second input performed by the user on the identifier of the target contact; and starting the target application in response to the second input, and displaying a user interface of the target application, wherein the user interface comprises message content corresponding to the identifier of the target contact.

* * * * *